(12) United States Patent
Kim et al.

(10) Patent No.: US 10,668,837 B2
(45) Date of Patent: Jun. 2, 2020

(54) BOOSTER SEAT

(71) Applicants: HYUNDAI MOTOR COMPANY, Seoul (KR); KIA MOTORS CORPORATION, Seoul (KR)

(72) Inventors: Ki Yong Kim, Suwon-si (KR); Jong Gon Kim, Daegu (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/196,066

(22) Filed: Nov. 20, 2018

(65) Prior Publication Data
US 2020/0101875 A1   Apr. 2, 2020

(30) Foreign Application Priority Data
Oct. 2, 2018   (KR) .................. 10-2018-0117394

(51) Int. Cl.
*A47C 1/08* (2006.01)
*B60N 2/28* (2006.01)
*B60N 2/75* (2018.01)

(52) U.S. Cl.
CPC ......... *B60N 2/2803* (2013.01); *B60N 2/2866* (2013.01); *B60N 2/79* (2018.02); *B60N 2002/2818* (2013.01)

(58) Field of Classification Search
CPC . B60N 2/26; B60N 2/265; B60N 2/28; B60N 2/2806; B60N 2/2809; B60N 2/2812; B60N 2/2821; A47D 1/10; A47D 1/103; A47D 15/006; A47D 1/106; A47D 1/006

USPC ................. 297/250.1, 256.16, 251
See application file for complete search history.

(56) References Cited

U.S. PATENT DOCUMENTS

| | | | | |
|---|---|---|---|---|
| 4,362,333 A * | 12/1982 | Cohen | ................... | A47D 1/106 297/134 |
| 5,685,604 A * | 11/1997 | Kain | ................... | B60N 2/2839 297/250.1 |
| 7,021,710 B2 * | 4/2006 | Kain | ................... | B60N 2/2851 297/250.1 |
| 7,261,376 B2 * | 8/2007 | Kespohl | ............... | B60N 2/2803 297/256.13 |
| 7,316,451 B2 * | 1/2008 | Balensiefer | ............. | A42B 3/00 297/216.12 |
| 8,870,284 B2 * | 10/2014 | Chapman | ............... | B60N 2/265 297/256.11 |
| 2005/0012372 A1 * | 1/2005 | Baloga | ................ | B60N 2/2803 297/256.15 |
| 2005/0200177 A1 * | 9/2005 | Balensiefer | .......... | B60N 2/2851 297/250.1 |
| 2005/0212342 A1 * | 9/2005 | Kain | ................... | B60N 2/2851 297/410 |
| 2006/0181125 A1 * | 8/2006 | Kespohl | ............... | B60N 2/2821 297/256.16 |

(Continued)

*Primary Examiner* — Chi Q Nguyen
(74) *Attorney, Agent, or Firm* — Brinks Gilson & Lione

(57) ABSTRACT

A booster seat includes: a seat base; and a pair of armrests integrated with a rear portion of the seat base, and spaced apart from each other in a width direction of the seat base. In particular, each armrest has a shoulder belt guide channel guiding a shoulder belt of a seat belt, and a lap belt guide channel guiding a lap belt of the seat belt, and the shoulder belt guide channel and the lap belt guide channel are separated from each other.

12 Claims, 4 Drawing Sheets

(56) References Cited

U.S. PATENT DOCUMENTS

| 2007/0001495 | A1* | 1/2007 | Boyle ................ | B60N 2/2806 |
| | | | | 297/253 |
| 2010/0176635 | A1* | 7/2010 | Glance ............... | B60N 2/2866 |
| | | | | 297/255 |
| 2012/0175922 | A1* | 7/2012 | Gillett ................ | B60N 2/2821 |
| | | | | 297/188.01 |

* cited by examiner

BOOSTER SEAT

CROSS-REFERENCE TO RELATED APPLICATION

This application claims priority to and the benefit of Korean Patent Application No. 10-2018-0117394, filed on Oct. 2, 2018, the entire contents of which are incorporated herein by reference.

FIELD

The present disclosure relates to a booster seat, and more particularly, to a booster seat designed to protect children from injury.

BACKGROUND

The statements in this section merely provide background information related to the present disclosure and may not constitute prior art.

A child safety seat (infant safety seat, child restraint system, child seat, baby seat, restraining car seat, car seat, etc.) is a seat designed specifically to protect children from injury or death during vehicle collisions.

A booster seat is a seat cushion that is used to raise a child's seating position. In general, most booster seats can be used for children who are between four and twelve years and between 40 and 59inches (100-150 cm) tall.

The booster seat does not have a seat belt system to hold the child in place. Instead, a vehicle seat belt goes around a child and the booster seat. The vehicle seat belt includes a shoulder belt and a lap belt which are separated by a tongue. The shoulder belt goes over the child's shoulder, and the lap belt goes over the child's thighs.

The booster seat may be divided into a high-backed booster seat having a back support, and a backless booster seat. The booster seat may have a pair of armrests.

Children have a large difference in body size depending on age, and even children of the same age are significantly different in body size depending on growth rate. We have discovered that it is desired to provide a method of efficiently restraining a child's body in addition to a correct seat belt fit to reduce injuries during vehicle collisions.

Meanwhile, the lap belt is routed under the armrest of the booster seat, and the shoulder belt is routed under or over the armrest of the booster seat according to the user's selection.

We have also discovered that when the shoulder belt is routed under the armrest of the booster seat, the shoulder belt is relatively far away from the child's neck and is positioned at the shoulder end of the child, so restraining the upper body of the child may become poor. Thus, as the upper body of the child moves forward to vehicle during a vehicle collision, the shoulder of the child come out of the shoulder belt, causing a serious injury to the child.

When the shoulder belt is routed over the armrest of the booster seat, we have discovered that the shoulder belt is positioned close to the child's neck, and the shoulder belt and the booster seat move independently of each other, so that the child's neck may get caught on the shoulder belt in a vehicle collision, which may lead to a fatal injury.

In order to solve the above-mentioned problems, a method of preventing the shoulder belt from slipping off the child's shoulder by adjusting the position of a D-ring guiding the shoulder belt is being studied.

We have discovered that it is difficult to change the position of the D-ring, due to interference with other parts, and the like. For example, when an attempt to change the position of the D-ring toward the inboard is made, pressure of a luggage room and interference in seat folding would make this D-ring position change impossible. In addition, when an attempt to change the position of the D-ring toward the upper side of a vehicle body is made, interference with trim parting line and restrictions on C-pillar design would make this D-ring position change impossible. Furthermore, when an attempt to change the position of the D-ring toward the rear of the vehicle body is made, restrictions on C-pillar design and interference between the D-ring and a tailgate would make this D-ring position change impossible.

The matters described in the background section are provided to assist in understanding the background of the present disclosure, and may include any technical concept which is not considered as the prior art known to those skilled in the art.

SUMMARY

The present disclosure has been made to solve the above-mentioned problems occurring in the prior art while advantages achieved by the prior art are maintained intact.

In one form, the present disclosure provides a booster seat designed to protect children from injuries more safely during vehicle collisions by guiding a shoulder belt across the middle of the child's shoulder.

In one form of the present disclosure, a booster seat may include: a seat base; and a pair of armrests integrated with a rear portion of the seat base, and spaced apart from each other in a width direction of the seat base, wherein each armrest may have a shoulder belt guide channel guiding a shoulder belt of a seat belt, and a lap belt guide channel guiding a lap belt of the seat belt.

The shoulder belt guide channel may be positioned higher than the lap belt guide channel.

The shoulder belt guide channel may be positioned behind the lap belt guide channel.

Each armrest may include a first extended portion which is vertically extended from the rear portion of the seat base, a second extended portion which is extended from the first extended portion toward a front portion of the seat base, and a third extended portion which is extended from the seat base toward the second extended portion.

The third extended portion may be continuously connected to a front end of the first extended portion, a height of the third extended portion may be lower than a height of the first extended portion, and a length of the third extended portion may be shorter than a length of the second extended portion.

Each armrest may further include a first ridge protruding from the third extended portion toward the second extended portion, and a second ridge protruding downwardly from the second extended portion.

The shoulder belt guide channel and the lap belt guide channel may be separated from each other by the first and second ridges.

The first extended portion may have a first guide surface facing the shoulder belt guide channel, the second extended portion may have a second guide surface facing the shoulder belt guide channel, the third extended portion may have a third guide surface facing the shoulder belt guide channel, and the first ridge may have a fourth guide surface facing the shoulder belt guide channel.

The first guide surface may be a vertical surface, the second guide surface may be a horizontal surface, the third guide surface may be a horizontal surface, and the fourth guide surface may be an inclined surface.

The third extended portion may have a fifth guide surface facing the lap belt guide channel, and the first ridge may have a sixth guide surface facing the lap belt guide channel.

The fifth guide surface may be a vertical surface, and the sixth guide surface may be a curved surface.

The sixth guide surface may have a notched recess.

The shoulder belt guide channel may be defined by the first extended portion, the second extended portion, the third extended portion, and the first ridge, and the lap belt guide channel may be defined by the third extended portion, the first ridge, and the second ridge.

The shoulder belt guide channel and the lap belt guide channel may have a gap there between, and the gap may be narrower than a width of the shoulder belt guide channel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
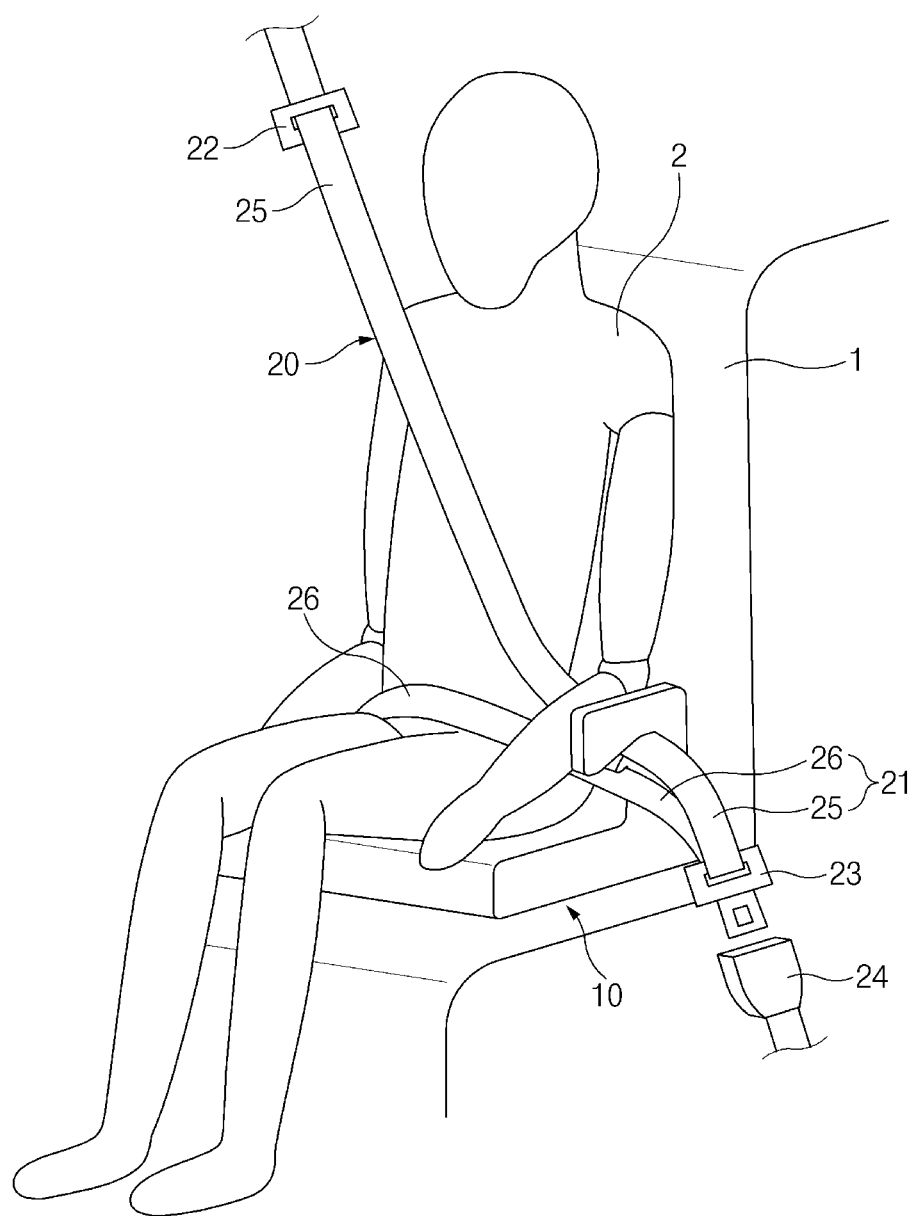
FIG. 1 illustrates a state in which a child sits on a booster seat according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These teams are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a booster seat 10 according to an exemplary form of the present disclosure may be designed to support a child on a vehicle seat 1. The booster seat 10 may be placed on the vehicle seat 1.

The child and the booster seat 10 may be restrained by a vehicle seat belt system 20.

FIG. 1 illustrates a typical three-point seat belt system. The vehicle seat belt system 20 may include a seat belt 21, a D-ring 22 guiding the seat belt 21, a tongue 23 configured to slide along a longitudinal direction of the seat belt 21, and a retractor (not shown) winding or unwinding the seat belt 21 on a reel. The tongue 23 may be detachably fastened to a buckle 24 fixed to the vehicle seat 1.

The seat belt 21 may include a shoulder belt 25 and a lap belt 26 which are separated by the tongue 23.

The shoulder belt 25 goes over the shoulder of a child sitting on the booster seat 10, and the lap belt 26 goes over the waist of the child sitting on the booster seat 10.

Figure 2:
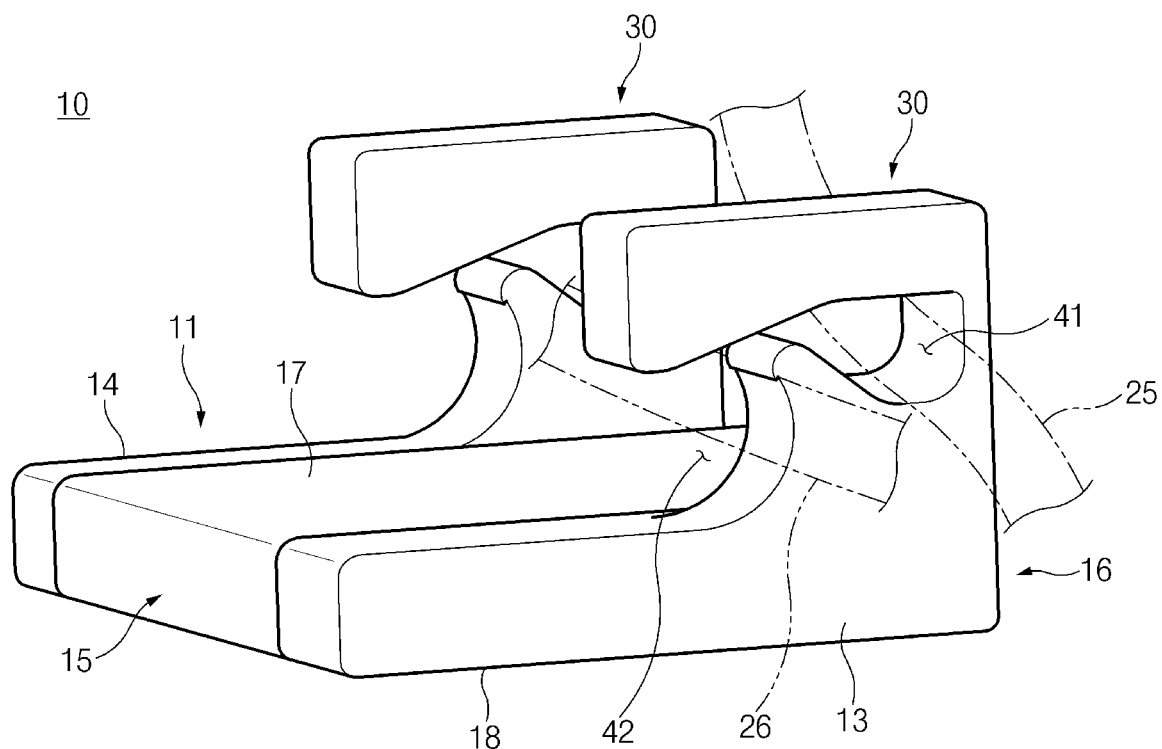
FIG. 2 illustrates a perspective view of a booster seat according to an exemplary form of the present disclosure.
Figure 3:
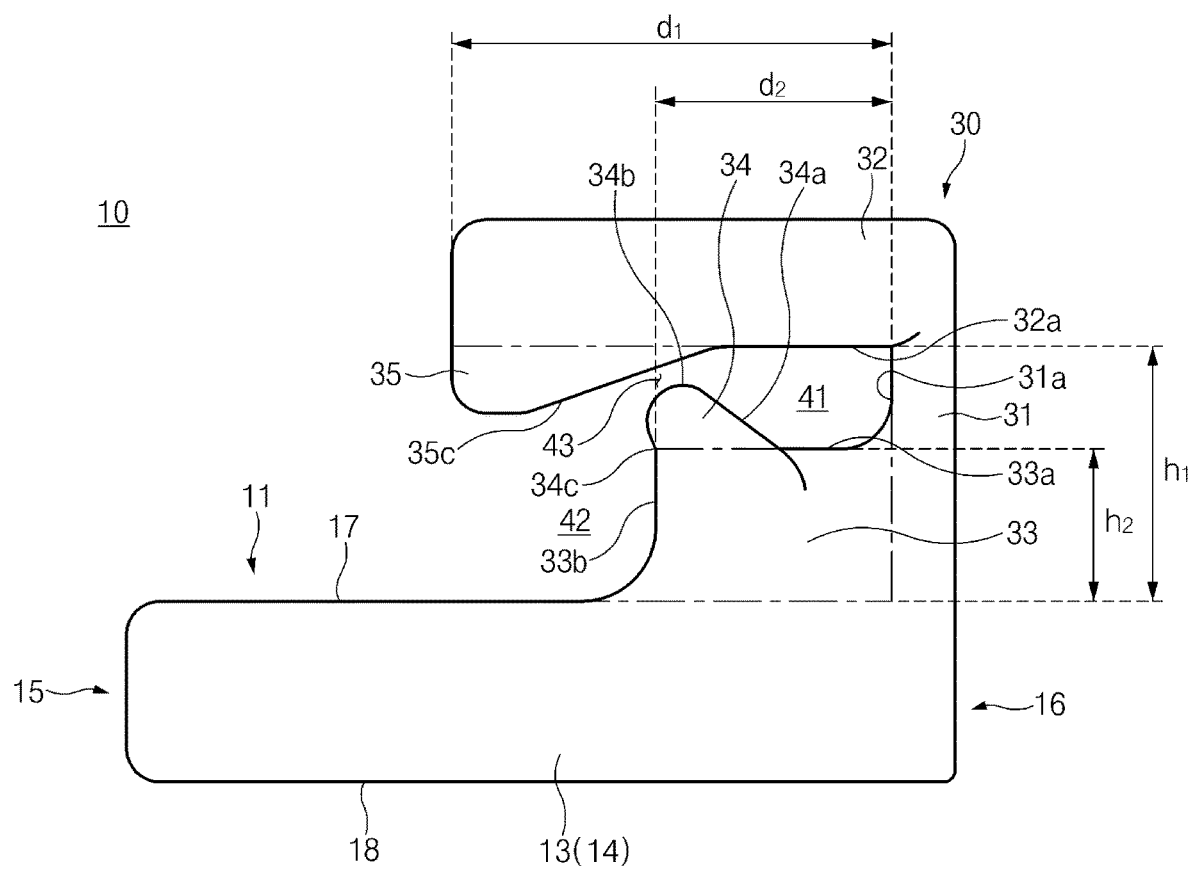
FIG. 3 illustrates a side view of a booster seat according to an exemplary foam of the present disclosure.

Referring to FIGS. 2 and 3, the booster seat 10 according to an exemplary form of the present disclosure may include a seat base 11.

The seat base 11 may have a first side surface 13, a second side surface 14, a front portion 15, a rear portion 16, a top surface 17, and a bottom surface 18.

The booster seat 10 may include a pair of armrests 30 integrated with the rear portion 16 of the seat base 11, and the pair of armrests 30 may be spaced apart from each other in a width direction of the seat base 11. The armrests 30 may be adjacent to the side surfaces 13 and 14 of the seat base 11, respectively.

Referring to FIG. 2, each armrest 30 may include a shoulder belt guide channel 41 guiding and receiving the shoulder belt 25, and a lap belt guide channel 42 guiding and receiving the lap belt 26. The shoulder belt guide channel 41 and the lap belt guide channel 42 may be separated from each other.

Referring to FIG. 3, each armrest 30 may include a first extended portion 31 which is vertically extended from the rear portion 16 of the seat base 11, a second extended portion 32 which is extended from the first extended portion 31 toward the front portion 15 of the seat base 11, and a third extended portion 33 which is extended from the seat base 11 toward the second extended portion 32.

The third extended portion 33 may be continuously connected to the front end of the first extended portion 31, and the third extended portion 33 may have a height h2 lower than that of the first extended portion 31 and a length d2 shorter than that of the second extended portion 32. In other words, the height h2 of the third extended portion 33 may be lower than a height h1 of the first extended portion 31, and the length d2 of the third extended portion 33 may be shorter than a length dl of the second extended portion 32. Thus, the first extended portion 31 and the third extended portion 33 may have a stair step structure formed on the rear portion 16 of the seat base 11.

In addition, each armrest 30 may further include a first ridge 34 protruding from the third extended portion 33 toward the second extended portion 32, and a second ridge 35 protruding downwardly from the second extended portion 32.

The first ridge 34 may protrude upwardly and diagonally from the front end of the third extended portion 33 toward the second extended portion 32, and the first ridge 34 may have a triangular shape. The second ridge 35 may protrude downwardly from the front end of the second extended portion 32, and the second ridge 35 may have a triangular shape.

The first extended portion 31 may have a first guide surface 31a facing the shoulder belt guide channel 41, the second extended portion 32 may have a second guide surface 32a facing the shoulder belt guide channel 41, the third extended portion 33 may have a third guide surface 33a facing the shoulder belt guide channel 41, and the first ridge 34 may have a fourth guide surface 34a facing the shoulder belt guide channel 41. The shoulder belt 25 received in the shoulder belt guide channel 41 may be guided through at least one of the first guide surface 31a, the second guide surface 32a, the third guide surface 33a, and the fourth guide surface 34a.

For example, the first guide surface 31a may be a vertical surface, the second guide surface 32a may be a horizontal surface, the third guide surface 33a may be a horizontal surface, and the fourth guide surface 34a may be an inclined surface. The shoulder belt guide channel 41 may be defined by the first extended portion 31, the second extended portion 32, the third extended portion 33, and the first ridge 34.

The lap belt guide channel 42 may be defined by the third extended portion 33, the first ridge 34, and the second ridge 35. The third extended portion 33 may have a fifth guide surface 33b facing the lap belt guide channel 42, and the first ridge 34 may have a sixth guide surface 34b facing the lap belt guide channel 42. The lap belt 26 may be guided through at least one of the fifth guide surface 33b and the sixth guide surface 34b.

For example, the fifth guide surface 33b may be a vertical surface, and the sixth guide surface 34b may be a curved surface.

In addition, the sixth guide surface 34b may have a notched recess 34c, and the lap belt 26 may be inhibited or prevented from being separated from the sixth guide surface 34b through the notched recess 34c. As illustrated in FIG. 3, the notched recess 34c may be formed at a portion where the fifth guide surface 33b and the sixth guide surface 34b meet.

A gap 43 may be formed between the shoulder belt guide channel 41 and the lap belt guide channel 42, and the gap 43 may be narrower than a width of the shoulder belt guide channel 41. The gap 43 may be defined by the first ridge 34 and the second ridge 35, and the shoulder belt 25 may pass through the gap 43 and be inserted into the shoulder belt guide channel 41. The second ridge 35 may have an inclined surface 35c, and the inclined surface 35c may face the top end of the first ridge 34. The shoulder belt 25 may be easily inserted into the shoulder belt guide channel 41 by the inclined surface 35c of the second ridge 35.

The third extended portion 33 may be continuously formed integrated with the front portion of the first extended portion 31, and the third extended portion 33 may be extended upwardly from the seat base 11, so that the shoulder belt guide channel 41 may be positioned higher than the lap belt guide channel 42.

The third extended portion 33 may be shorter than the second extended portion 32, and the lap belt guide channel 42 may be positioned at the front end of the third extended portion 33, and the shoulder belt guide channel 41 may be positioned on the top of the third extended portion 33. The shoulder belt guide channel 41 may be positioned behind the lap belt guide channel 42.

The shoulder belt guide channel 41 may be positioned higher than the lap belt guide channel 42, and the shoulder belt guide channel 41 may be positioned behind the lap belt guide channel 42, so that the routing of the shoulder belt may be improved, and the shoulder belt guide channel may route the shoulder belt over the middle of the child's shoulder properly.

In particular, the shoulder belt guide channel 41 and the lap belt guide channel 42 may be separated from each other by the first and second ridges 34 and 35, so that the shoulder belt guide channel 41 may independently guide and receive the shoulder belt 25, and the lap belt guide channel 42 may independently guide and receive the lap belt 26.

Figure 4:
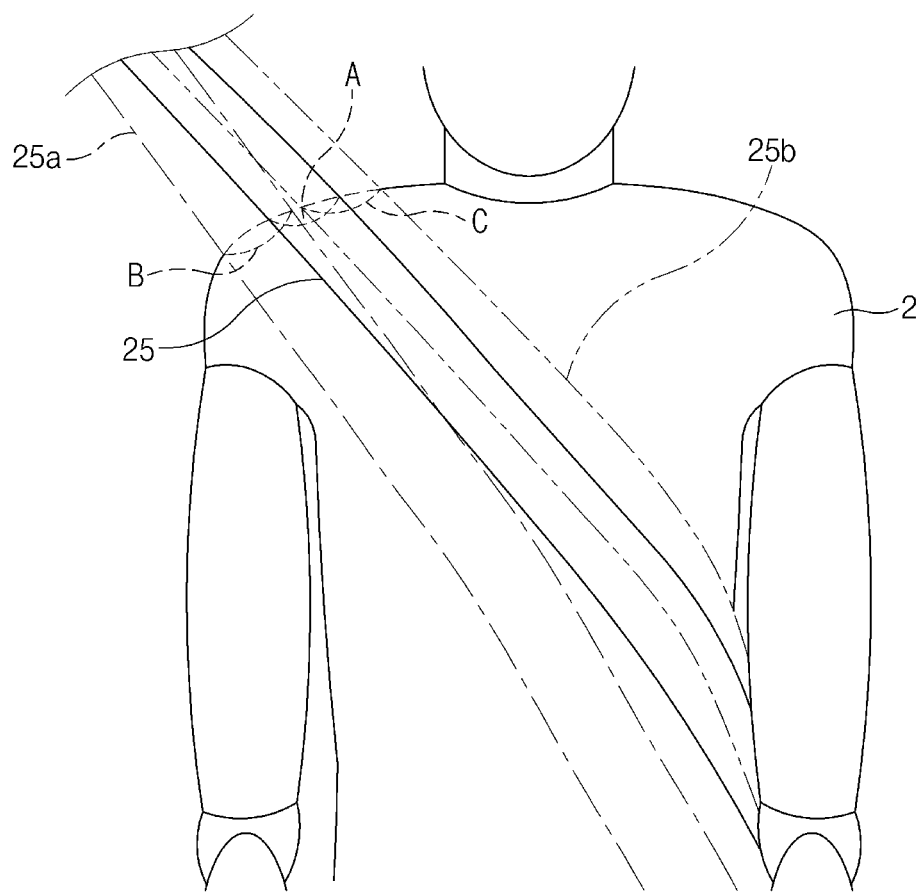
FIG. 4 illustrates the routing of a shoulder belt for a booster seat according to an exemplary form of the present disclosure, and the routing of a shoulder belt for a booster seat according to the related art.

Referring to FIG. 4, when a shoulder belt 25b of a booster seat according to the related art is routed over the armrest, the shoulder belt 25b is positioned close to the child's neck (see portion C in FIG. 4), and the shoulder belt and the booster seat move independently of each other, so that the child's neck may get caught on the shoulder belt in a vehicle collision, which may lead to a fatal injury.

In addition, when a shoulder belt 25a of a booster seat according to the related art is routed under the armrest, the shoulder belt 25a is relatively far away from the child's neck and is positioned at the shoulder end of the child (see portion B in FIG. 4), so restraining the upper body of the child may become poor. Thus, as the upper body of the child moves forward during a vehicle collision, the shoulder of the child come out of the shoulder belt, causing a serious injury to the child.

On the other hand, according to an exemplary form of the present disclosure, as the shoulder belt guide channel 41 and the lap belt guide channel 42 are separated from each other, the routing of the shoulder belt 25 and the routing of the lap belt 26 may be independent of each other, so that the shoulder belt 25 may lie across the middle of the child's shoulder with accuracy and ease.

In particular, the shoulder belt guide channel 41 may be positioned higher than the lap belt guide channel 42 and the shoulder belt guide channel 41 may be positioned behind the lap belt guide channel 42, so that the routing of the shoulder belt 25 may be improved.

As set forth above, according to exemplary forms of the present disclosure, the shoulder belt guide channel and the lap belt guide channel may be separated from each other in the armrests of the booster seat, so that the routing of the shoulder belt and the routing of the lap belt may be independent of each other.

In addition, according to exemplary forms of the present disclosure, the shoulder belt guide channel may be positioned higher than the lap belt guide channel and the shoulder belt guide channel may be positioned behind the lap belt guide channel, so that the routing of the shoulder belt may be improved, and the shoulder belt guide channel may route the shoulder belt over the middle of the child's shoulder properly.

Hereinabove, although the present disclosure has been described with reference to exemplary forms and the accompanying drawings, the present disclosure is not limited thereto, but maybe variously modified and altered by those skilled in the art to which the present disclosure pertains without departing from the spirit and scope of the present disclosure.

What is claimed is:

1. A booster seat, comprising:
a seat base; and
a pair of armrests integrated with a rear portion of the seat base, and spaced apart from each other in a width direction of the seat base,
wherein;
each armrest includes a shoulder belt guide channel for guiding a shoulder belt of a seat belt, and a lap belt guide channel for guiding a lap belt of the seat belt,
said each armrest includes a first extended portion which is vertically extended from the rear portion of the seat base, a second extended portion which is extended from the first extended portion toward a front portion of the seat base, and a third extended portion which is extended from the seat base toward the second extended portion, and
the third extended portion is continuously connected to a front end of the first extended portion.

2. The booster seat according to claim 1, wherein the shoulder belt guide channel is positioned higher than the lap belt guide channel.

3. The booster seat according to claim 1, wherein the shoulder belt guide channel is positioned behind the lap belt guide channel.

4. The booster seat according to claim 1, wherein:
a height of the third extended portion is lower than a height of the first extended portion, and
a length of the third extended portion is shorter than a length of the second extended portion.

5. The booster seat according to claim 4, wherein each armrest further includes a first ridge protruding from the third extended portion toward the second extended portion, and a second ridge protruding downwardly from the second extended portion, and
wherein the shoulder belt guide channel and the lap belt guide channel are separated from each other by the first and second ridges.

6. The booster seat according to claim 5, wherein:
the first extended portion includes a first guide surface facing the shoulder belt guide channel,
the second extended portion includes a second guide surface facing the shoulder belt guide channel,
the third extended portion includes a third guide surface facing the shoulder belt guide channel, and
the first ridge includes a fourth guide surface facing the shoulder belt guide channel.

7. The booster seat according to claim 6, wherein:
the first guide surface is a vertical surface,
the second guide surface is a horizontal surface,
the third guide surface is a horizontal surface, and
the fourth guide surface is an inclined surface.

8. The booster seat according to claim 5, wherein the third extended portion includes a fifth guide surface facing the lap belt guide channel, and
the first ridge includes a sixth guide surface facing the lap belt guide channel.

9. The booster seat according to claim 8, wherein the fifth guide surface is a vertical surface, and
the sixth guide surface is a curved surface.

10. The booster seat according to claim 9, wherein the sixth guide surface includes a notched recess.

11. The booster seat according to claim 5, wherein the shoulder belt guide channel is defined by the first extended portion, the second extended portion, the third extended portion, and the first ridge, and
wherein the lap belt guide channel is defined by the third extended portion, the first ridge, and the second ridge.

12. The booster seat according to claim 1, wherein the shoulder belt guide channel and the lap belt guide channel have a gap therebetween, and
the gap is narrower than a width of the shoulder belt guide channel.

* * * * *